(12) United States Patent
Ajisaka

(10) Patent No.: US 8,544,583 B2
(45) Date of Patent: Oct. 1, 2013

(54) COOLING AIRFLOW INTAKE STRUCTURE

(75) Inventor: Satoshi Ajisaka, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/257,759

(22) PCT Filed: Jun. 3, 2010

(86) PCT No.: PCT/JP2010/059475
§ 371 (c)(1), (2), (4) Date: Sep. 20, 2011

(87) PCT Pub. No.: WO2011/151917
PCT Pub. Date: Dec. 8, 2011

(65) Prior Publication Data
US 2012/0024611 A1    Feb. 2, 2012

(51) Int. Cl.
*B60K 11/08*    (2006.01)
(52) U.S. Cl.
USPC ........................................ 180/68.1; 296/208
(58) Field of Classification Search
USPC ............. 180/68.1, 68.2; 296/187.08, 187.09, 296/193.07, 208
See application file for complete search history.

(56) References Cited

U.S. PATENT DOCUMENTS

| | | | | |
|---|---|---|---|---|
| 1,979,191 A | * | 10/1934 | Dennistoun | ................... 180/68.1 |
| 2,247,742 A | * | 7/1941 | Best | .............................. 180/68.1 |
| 2,913,065 A | * | 11/1959 | Lyon, Jr. | ....................... 180/68.1 |
| 4,805,747 A | * | 2/1989 | Moedinger et al. | ........ 188/264 A |
| 4,810,021 A | * | 3/1989 | Burst | ........................... 296/180.1 |
| 5,322,340 A | * | 6/1994 | Sato et al. | .................... 296/180.1 |
| 5,526,872 A | * | 6/1996 | Gielda et al. | ...................... 165/41 |
| 6,341,814 B1 | * | 1/2002 | Honninger et al. | ............ 296/208 |
| 6,854,544 B2 | * | 2/2005 | Vide | .............................. 180/68.6 |
| 7,886,859 B2 | * | 2/2011 | Caldirola | ..................... 180/68.2 |
| 2003/0121638 A1 | | 7/2003 | Molari et al. | |

(Continued)

FOREIGN PATENT DOCUMENTS

DE    3150152 A1 *    6/1983
EP       391391 A1 *   10/1990

(Continued)

OTHER PUBLICATIONS

International Search Report issued Jul. 6, 2010 & Written Opinion of PCT/JP2010/059475.

(Continued)

*Primary Examiner* — J. Allen Shriver, II
*Assistant Examiner* — Bridget Avery
(74) *Attorney, Agent, or Firm* — Kenyon & Kenyon LLP

(57) ABSTRACT

A cooling airflow intake structure that can efficiently channel an airflow for cooling from outside a vehicle to a body to be cooled is obtained. The cooling airflow intake structure includes: a power unit that generates a driving force for an automobile to travel; an undercover that covers, from a vehicle underside, a power unit chamber in which the power unit is placed; a cooling unit that is placed on a vehicle rear side of the power unit; a first duct that channels air to the cooling unit from a first inlet port that is formed opening toward a road surface in the undercover; and a second duct that channels air to the cooling unit from a second inlet port that is formed opening toward a vehicle front side in a bumper cover. The second duct is disposed between the power unit and the undercover in a vehicle vertical direction.

6 Claims, 5 Drawing Sheets

(56) References Cited

U.S. PATENT DOCUMENTS

| | | | |
|---|---|---|---|
| 2003/0201133 A1* | 10/2003 | Kobayashi et al. | 180/291 |
| 2011/0284298 A1* | 11/2011 | Ajisaka | 180/65.21 |
| 2012/0024611 A1* | 2/2012 | Ajisaka | 180/68.1 |
| 2012/0153681 A1 | 6/2012 | Ajisaka | |

FOREIGN PATENT DOCUMENTS

| | | |
|---|---|---|
| EP | 1495896 A2 | 1/2005 |
| JP | 03-079225 B2 | 7/1983 |
| JP | 63-145715 U | 9/1988 |
| JP | 4-79724 U | 7/1992 |
| JP | 4-129383 U | 11/1992 |
| JP | 05-301528 A | 11/1993 |
| JP | 05301528 A * | 11/1993 |
| JP | 7-158442 A | 6/1995 |
| JP | 10-100939 A | 4/1998 |
| JP | 2006-347309 A | 12/2006 |
| JP | 2007-050802 A | 3/2007 |
| JP | 2007-069651 A | 3/2007 |

OTHER PUBLICATIONS

Translation of Decision to Grant Patent mailed Jul. 17, 2012 in JP 2011-501045.

Office Action dated Nov. 7, 2012 for the related U.S. Appl. No. 13/145,975.

* cited by examiner

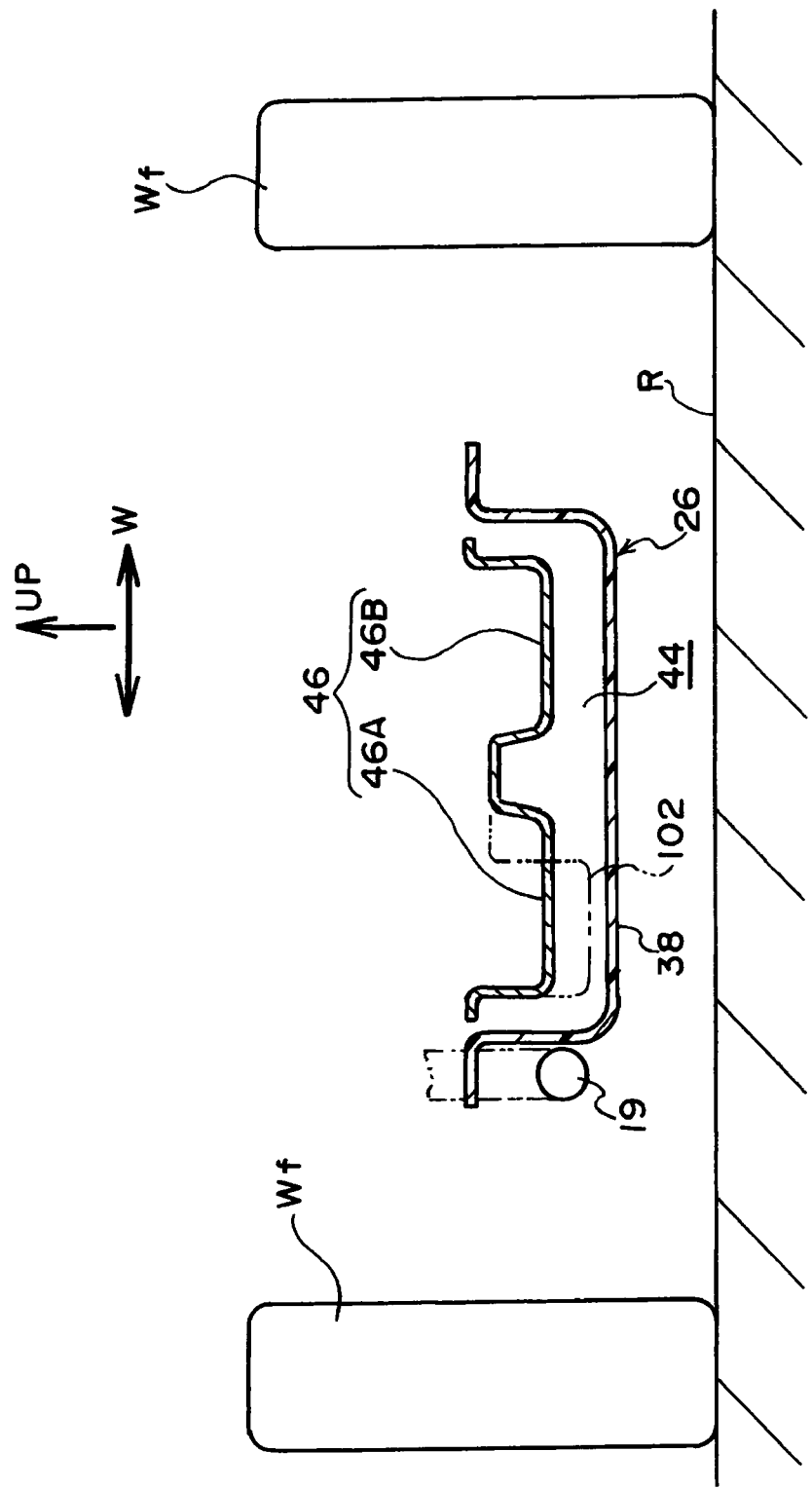

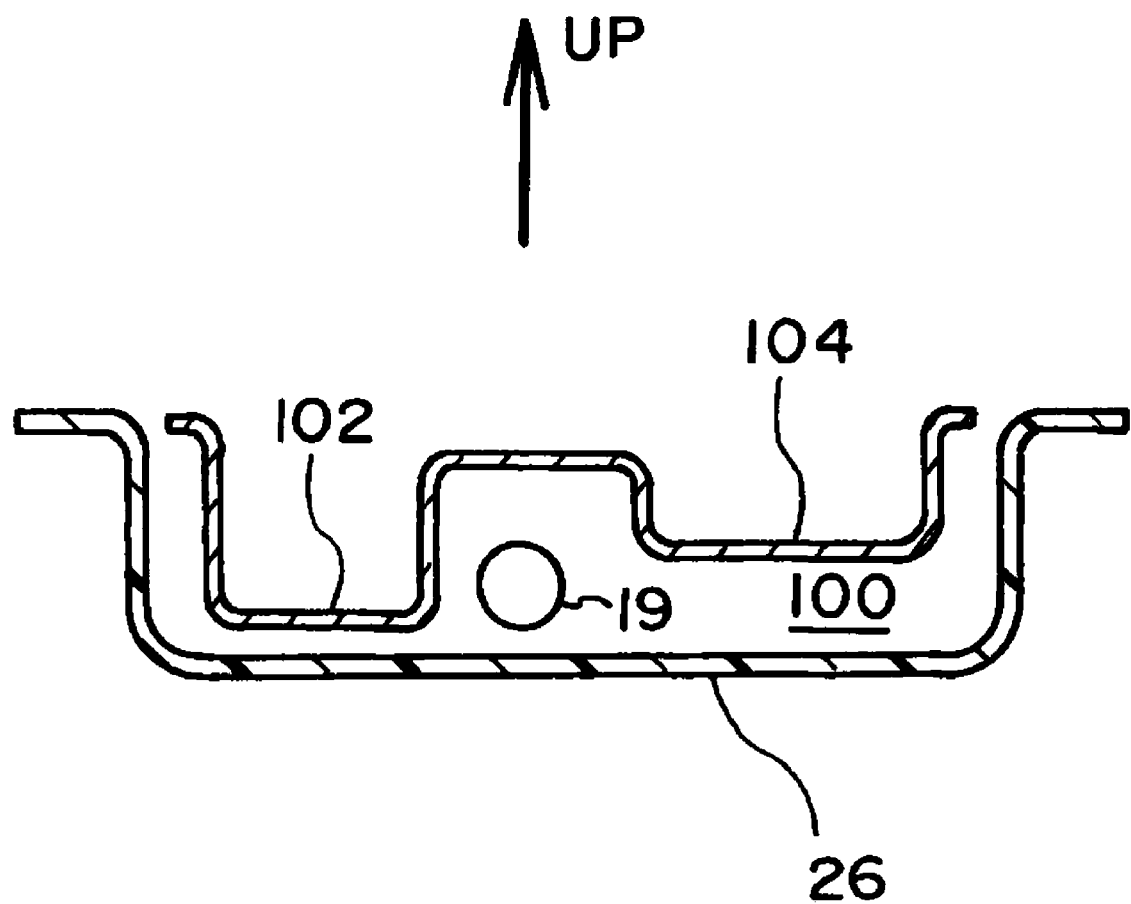

COOLING AIRFLOW INTAKE STRUCTURE

This is a 371 national phase application of PCT/JP2010/059475 filed 03 Jun. 2010, the contents of which are incorporated herein by reference.

TECHNICAL FIELD

The present invention relates to a cooling airflow intake structure for channeling a cooling airflow to a body to be cooled on a rear side of a power unit.

BACKGROUND ART

A vehicle body front part structure that channels a cooling airflow through an open portion in a grill or a bumper cover disposed on a vehicle front end to a radiator placed on a vehicle front side of an engine is known (e.g., see JP-A No. 2007-69651).

SUMMARY OF THE INVENTION

Technical Problem

Incidentally, in a case where the engine or the like is placed between the open portion on the vehicle front end and a body to be cooled, it is difficult for the airflow that has been taken in from the open portion in the bumper cover or the like to reach the body to be cooled because the airflow is blocked by the engine, and there is room for improvement from the standpoint of efficiently cooling the body to be cooled.

It is an object of the present invention to obtain a cooling airflow intake structure that can efficiently channel an airflow for cooling from outside a vehicle to a body to be cooled.

Means for Solving the Problem

A cooling airflow intake structure pertaining to a first aspect of the present invention comprises: a power unit that generates a driving force for a vehicle to travel; an undercover that covers, from a vehicle underside, a power unit-use space in which the power unit is placed; a body to be cooled that is placed on a vehicle rear side of the power unit; a first duct that channels air to the body to be cooled from a first inlet port that is formed opening toward a road surface in the undercover; and a second duct that is disposed between the power unit and the undercover in a vehicle vertical direction and channels air to the body to be cooled from a second inlet port that is formed opening toward a vehicle front side in a bumper cover.

According to the above-described aspect, the airflow that has been taken into the first duct through the first inlet port from under the undercover by vehicle travel or the actuation of a fan, for example, is channeled to the body to be cooled as a cooling airflow. Further, the airflow that has been taken into the second duct through the second inlet port from the front of the bumper is channeled to the body to be cooled as a cooling airflow.

Here, in the present cooling airflow intake structure, because the two ducts described above are disposed, it becomes easy to ensure the flow rate of the airflow compared to a configuration that channels the cooling airflow from outside the vehicle to the cooling unit via only either one duct. Further, because the second duct is placed between the undercover and the power unit, the airflow from the second inlet port is channeled to the body to be cooled without passing around the power unit, that is, while the airflow is kept from being affected by the heat of the power unit. Because of these, the required cooling function is fulfilled in the body to be cooled.

In this way, in the cooling airflow intake structure of the above-described aspect, an airflow for cooling from outside the vehicle can be efficiently channeled to the body to be cooled.

In the above-described aspect, the cooling airflow intake structure may be given a configuration where a lower surface of the second duct is configured by the undercover and at least part of an upper surface of the second duct is configured by a lower surface of a functional part placed in the power unit-use space.

According to the above-described aspect, the lower surface of the second duct is configured by the undercover and at least part of the upper surface of the second duct is configured by the lower surface of the functional part (a part having a function independent of the second duct) placed in the power unit-use space. For this reason, the second duct in which it is difficult for the cooling airflow to be affected by the heat of the power unit is configured by effectively utilizing the space between the undercover and the power unit in the vehicle vertical direction. That is, it is easy to ensure the cooling capacity resulting from the airflow channeled by the second duct.

In the above-described aspect, the cooling airflow intake structure may be given a configuration where at least part of the upper surface of the second duct is configured by an oil pan that receives lubricating oil of the power unit or an oil pan that receives lubricating oil of a transmission mechanism that transmits the driving force of the power unit to vehicle wheels.

According to the above-described aspect, an oil pan that is ordinarily placed in the neighborhood of the lowermost portion of the power unit-use space configures the upper surface of the second duct, so the second duct in which it is difficult for the cooling airflow to be affected by the heat of the power unit is configured by effectively more effectively utilizing the space between the undercover and the power unit. That is, it is easy to ensure the cooling capacity resulting from the airflow channeled by the second duct.

In the above-described aspect, the cooling airflow intake structure may be given a configuration where the second duct has a constricting structure in which the distance between its upper surface and its lower surface is made narrower at one section in a vehicle longitudinal direction than at other sections.

According to the above-described aspect, the flow speed of the airflow that has passed through the constricting structure of the second duct increases, and the airflow is channeled to the body to be cooled. Because of this, the airflow in the second duct can be efficiently channeled to the body to be cooled compared to a configuration where the channel cross section of the second duct is constant at each section in the longitudinal direction. That is, the airflow channeling efficiency of the cooling airflow intake structure overall improves.

In the above-described aspect, the cooling airflow intake structure may be given a configuration where the second duct merges with the first duct on the vehicle front side of the body to be cooled and on the vehicle rear side of the constricting structure.

According to the above-described aspect, the airflow in the second duct merges with the airflow in the first duct on the front side of the body to be cooled and is channeled to the body to be cooled. Here, because the second duct merges with the first duct on the rear side of the constricting structure, that is, the section where the flow speed of the airflow increases, the airflows from the second duct and the first duct can be more efficiently channeled to the body to be cooled in a configuration where the second duct merges with the first duct in this way.

In the above-described aspect, the cooling airflow intake structure may be given a configuration where the first inlet port is formed between the power unit and the body to be cooled in the undercover, the first duct is formed by a shroud that covers the space between the first inlet port and the body to be cooled, and a confluence port with which the second duct merges is formed opening toward the vehicle front side in the shroud.

According to the above-described aspect, the shroud is formed opening toward the first inlet port on one end side thereof, is formed opening toward the body to be cooled on the other end side thereof, and has the confluence port in a wall portion facing the vehicle front side on one end side thereof. Because of this, the first duct with which the second duct merges can be formed by a simple structure.

Advantageous Effects of the Invention

As described above, the cooling airflow intake structure pertaining to the present invention has the excellent effect that it can efficiently channel an airflow for cooling from outside a vehicle to a body to be cooled.

BRIEF DESCRIPTION OF THE DRAWINGS

FIG. 4 is a front sectional view showing a second duct of the cooling airflow intake structure pertaining to the embodiment of the present invention; and FIG. 5 is a front sectional view showing a cooling airflow intake structure pertaining to a comparative example that is compared to the embodiment of the present invention.

BEST MODE FOR CARRYING OUT THE INVENTION

Figure 1:
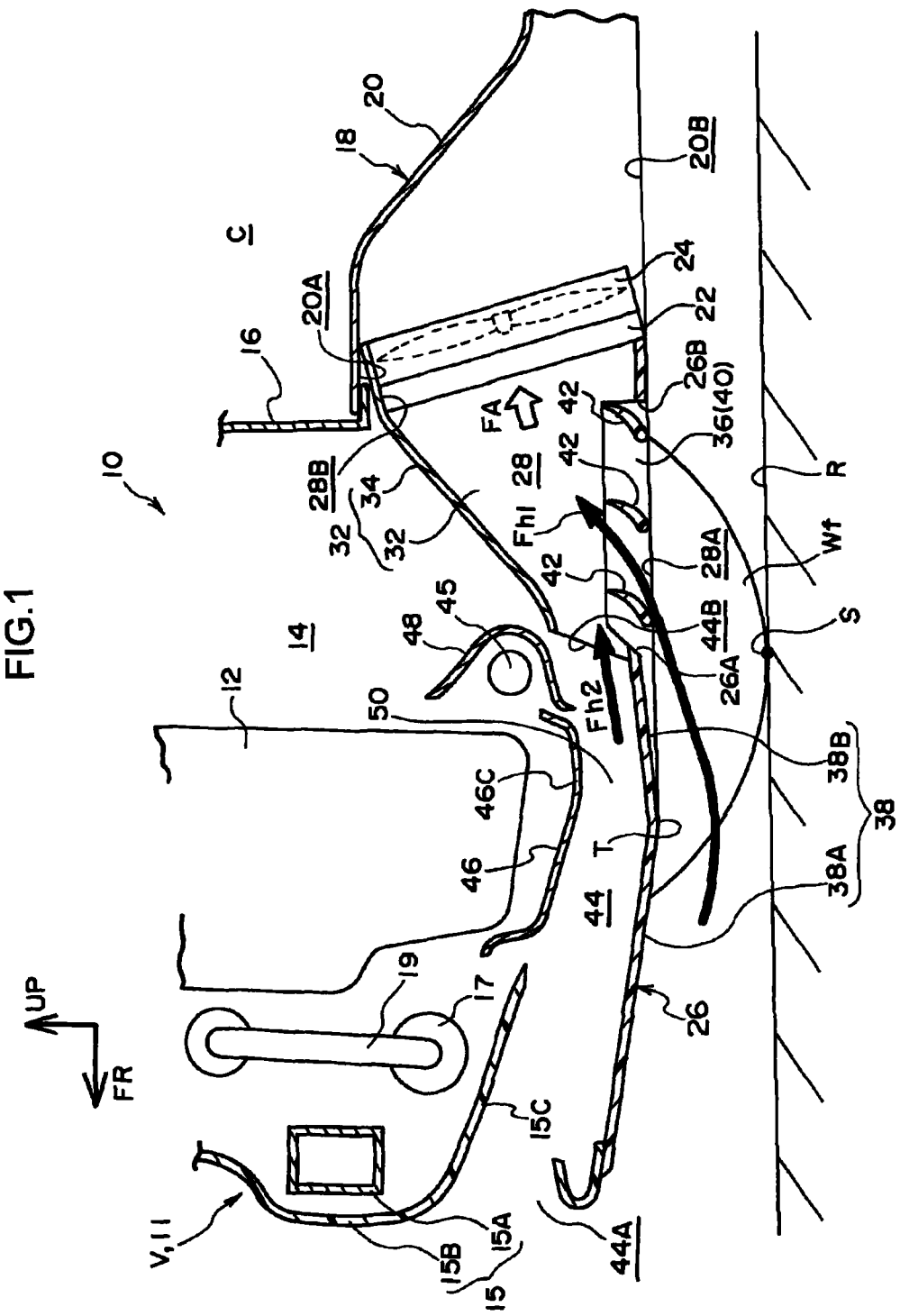
FIG. 1 is a side sectional view showing the main portions of a cooling airflow intake structure pertaining to an embodiment of the present invention.

A cooling airflow intake structure 10 pertaining to an embodiment of the present invention will be described on the basis of FIG. 1 to FIG. 4. First, the configuration of a vehicle body 11 of an automobile V to which the cooling airflow intake structure 10 is applied will be described, and next the specific configuration of the cooling airflow intake structure 10 will be described. Arrow FR appropriately written in the drawings represents a front direction in a vehicle longitudinal direction, arrow UP represents an up direction in a vehicle vertical direction, and arrow W represents a vehicle width direction.

(General Configuration of Vehicle Body)

In FIG. 1, the front portion of the automobile V to which the cooling airflow intake structure 10 is applied is shown in a schematic side sectional view. As shown in this drawing, a power unit chamber 14 serving as a power unit-use space in which a power unit 12 is disposed is placed on the vehicle longitudinal direction front end side of the automobile V. The power unit 12 in this embodiment is configured to include an engine that is an internal combustion engine and an electric motor as drive sources for driving front wheels Wf. Consequently, the automobile V is configured to be a hybrid automobile having two drive sources.

Specifically, the power unit is configured to include as its main portions a transverse engine, which has a crankshaft along the vehicle width direction, and a transaxle, which is coupled so as to be capable of transmitting power to the engine. The transaxle is configured to include the electric motor, an unillustrated generator, a power splitter, a transmission that is a continuously variable transmission or the like, etc. Further, in this embodiment, the transaxle is configured to include an inverter that is electrically connected to the electric motor, the generator, and a battery, for example. Consequently, the power unit pertaining to this embodiment can also be taken as a power plant.

The power unit chamber 14 in which the power unit 12 configured to include the engine that is an internal combustion engine as described above is disposed can be taken as an engine room. The vehicle longitudinal direction rear end portion of the power unit chamber 14 is defined by a dash panel 16 that partitions the power unit chamber 14 from a cabin C. The dash panel 16 is joined to the vehicle longitudinal direction front end portion of a floor panel 18. The vehicle longitudinal direction front end portion of the power unit chamber 14 is defined by a front bumper 15. The front bumper 15 is configured to include as its main portions a bumper reinforcement 15A and a bumper cover 15B that covers the bumper reinforcement 15A from the vehicle front side.

A catalytic converter 17 for purifying exhaust gas of the internal combustion engine configuring the power unit 12 is placed on the front side of the power unit 12 in the power unit chamber 14. The exhaust gas that has passed through the catalytic converter 17 is released into the atmosphere through an exhaust pipe 19.

Further, in the vehicle body 11, a floor tunnel 20 that forms a "U" shape opening downward in the vehicle vertical direction when seen in a front sectional view is formed in the vehicle width direction center portion of the floor panel 18. Additionally, in the automobile V to which the cooling airflow intake structure 10 is applied, a cooling unit 22 serving as a body to be cooled is disposed so as to block an open end 20A on the vehicle longitudinal direction front side of the front tunnel 20. Consequently, in this embodiment, the cooling unit 22 is placed on the vehicle longitudinal direction rear side of the power unit 12. The cooling unit 22 is configured to include at least one (in this embodiment, both) of a radiator, which is an air-cooled heat exchanger that causes cooling water to circulate between the radiator and (the engine and the electric motor of) the power unit 12 and cools the power unit 12, and a condenser, which is an air-cooled heat exchanger that configures (a refrigeration cycle of) an unillustrated air conditioning unit.

Further, a fan unit 24 is disposed on the vehicle longitudinal direction rear surface side of the cooling unit 22. Because of the actuation of this fan unit 24, a cooling airflow that performs heat exchange with the cooling water passes through the cooling unit 22 from its vehicle longitudinal direction front surface side to its rear surface side. The cooling airflow after having performed heat exchange with the cooling water is discharged under the floor through a downward-facing open end 20B of the floor tunnel 20.

Below, the cooling airflow intake structure 10 for channeling the cooling airflow that performs heat exchange with a coolant (the cooling water circulating through the radiator, an air conditioner coolant) to this cooling unit 22 will be described in detail.

(Configuration of Cooling Airflow Intake Structure)

Figure 2:
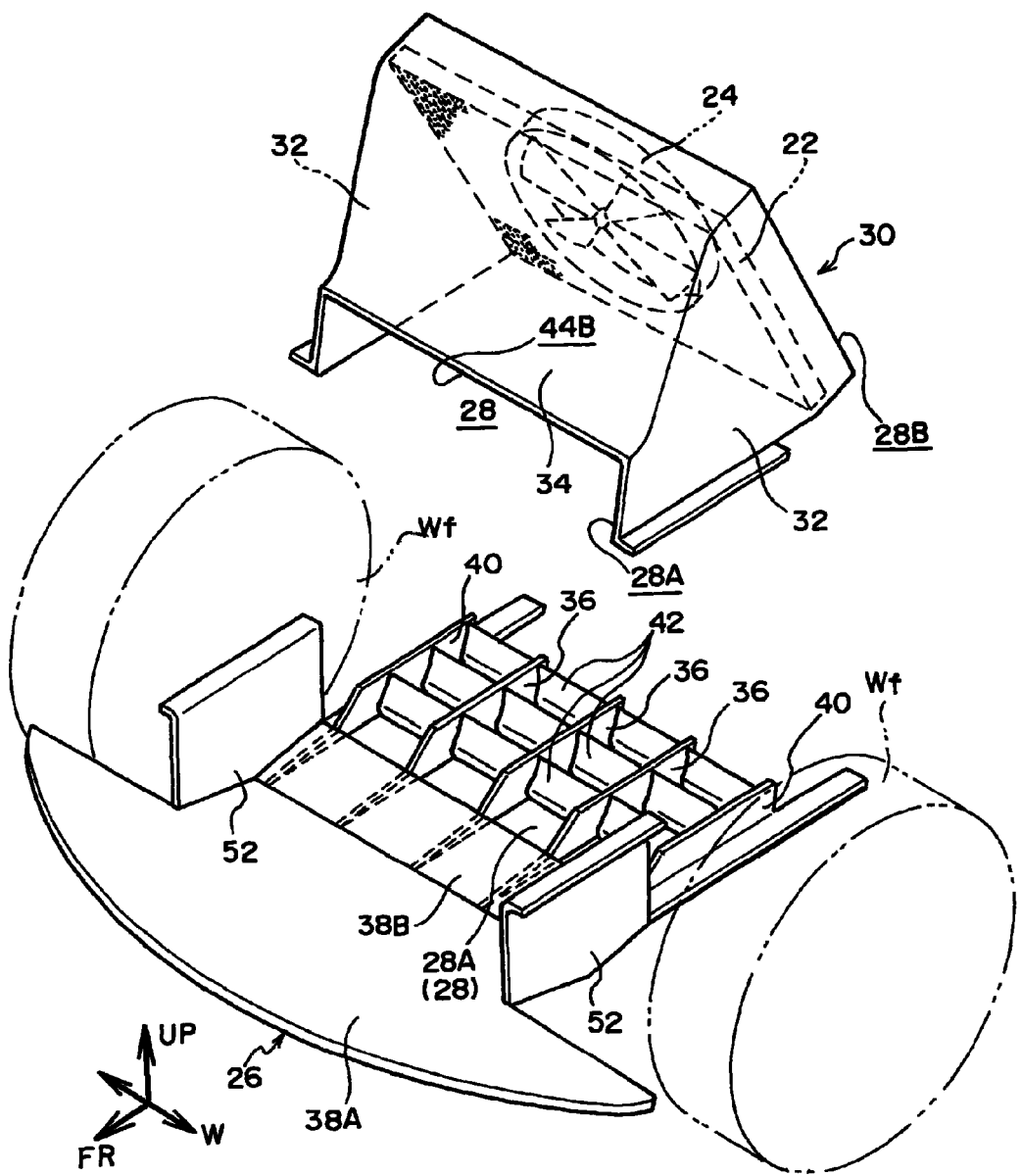
FIG. 2 is an exploded perspective view showing configural portions of a first duct in the cooling airflow intake structure pertaining to the embodiment of the present invention.
Figure 3:
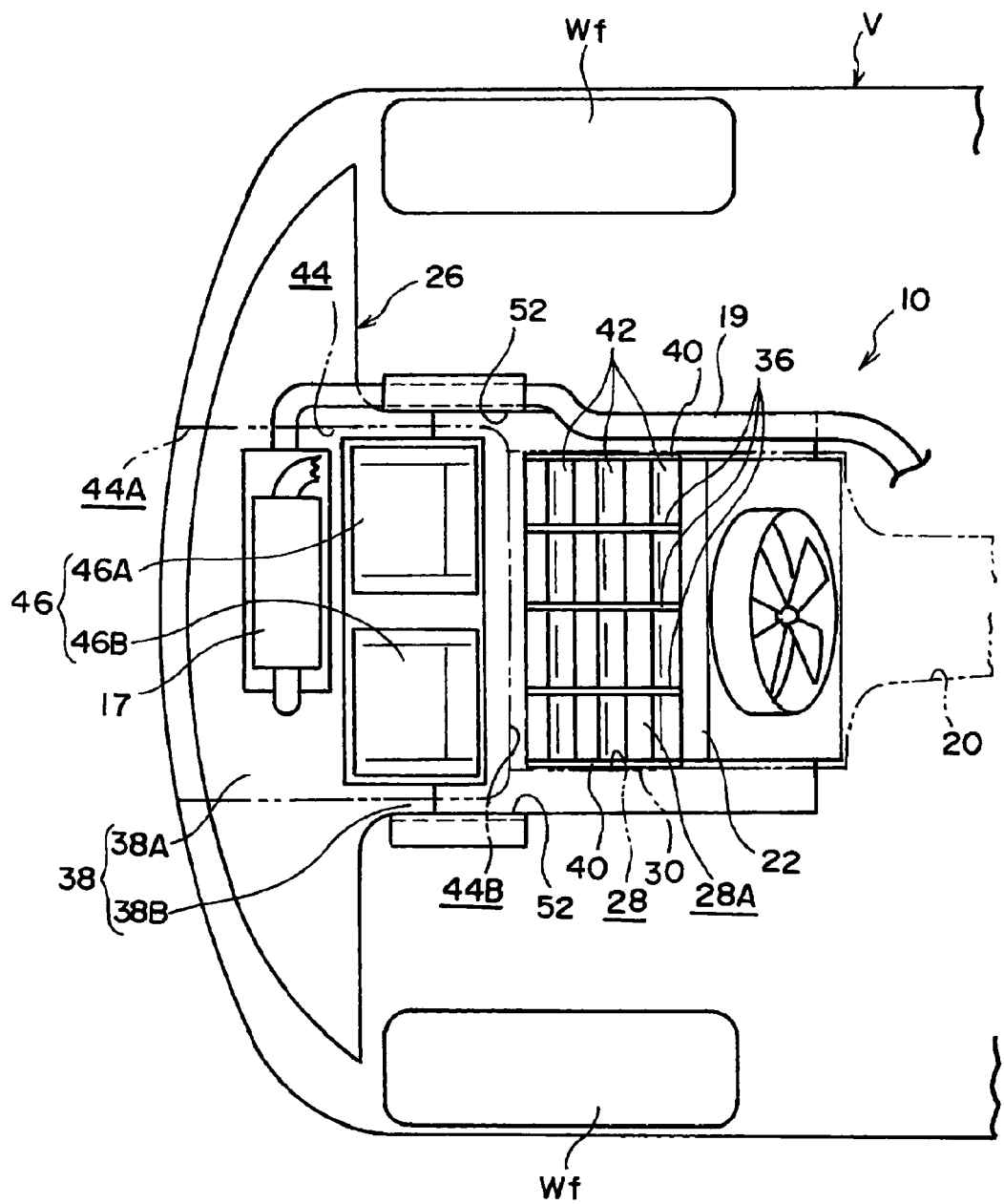
FIG. 3 is a plan view showing, with the exception of some parts, the cooling airflow intake structure pertaining to the embodiment of the present invention.

As shown in FIG. 1, the cooling airflow intake structure 10 is equipped with an undercover 26 that covers the power unit chamber 14 from the vehicle vertical direction underside. A first inlet port 28A that is an open portion for channeling into a first duct 28 a vehicle-induced airflow flowing between the undercover 26 and a road surface R is formed in the undercover 26. In this embodiment, as shown in FIG. 2 and FIG. 3, the first inlet port 28A is formed opening between the left and right front wheels Wf and in a vehicle rear position of the portion between the left and right front wheels Wf. In other words, the first inlet port 28A opens including the portion on the vehicle rear side of a contact portion S between the front wheels Wf and the road surface R, that is, a range in which foreign matter is kicked up as the front wheels Wf rotate.

Further, the cooling airflow intake structure 10 is equipped with a shroud 30 that forms the first duct 28 between the first inlet port 28A and the front surface (the open end 20A) of the cooling unit 22. That is, an open portion on one end side of the shroud 30 coincides with the first inlet port 28A that is the inlet of the first duct 28, and an open portion on the other end side of the shroud 30 is configured to be an outlet port 28B that is the outlet of the first duct 28. Moreover, a confluence port 44B with which a later-described second duct 44 merges is formed in the front end portion of the shroud 30 in this embodiment.

The shroud 30 has a left and right pair of side walls 32 that oppose each other in the vehicle width direction and a top wall 34 that interconnects the vehicle vertical direction upper edges of the pair of side walls 32, and the first duct 28 is defined by the pair of side walls 32 and the top wall 34. That is, the space in the first duct 28 enclosed by the pair of side walls 32 and the top wall 34 between the first inlet port 28A and the outlet port 28B is configured to serve as a cooling airflow channel. Although it is not shown in the drawings, the shroud 30 in this embodiment is unitized (modularized) such that it can be handled integrally with the cooling unit 22 and the fan unit 24.

Additionally, the cooling unit 22 is interposed in a sealed state between the open end 20A on the front side of the floor tunnel 20 and the outlet port 28B of the first duct 28. That is, the first duct 28 (the space between the automobile V and the road surface R) and the floor tunnel 20 are communicated via (the air-side channel of) the cooling unit 22. The cooling unit 22 may be given a configuration where part of all of it is placed in the front portion of the floor tunnel 20 or a configuration where part or all of it is placed in the rear portion of the first duct 28. That is, it suffices for the cooling unit 22 to be placed in the middle portion of the space (air channel) formed by the first duct 28 and the floor tunnel 20.

Further, in this embodiment, the cooling unit 22 is placed inclined (forwardly inclined) such that its vehicle upper end side is positioned on the vehicle front side of its lower end side. The positions of the vehicle longitudinal direction rear end of the first inlet port 28A and the vehicle vertical direction lower end of the outlet port 28B substantially coincide with the position of the vehicle vertical direction lower end of the cooling unit 22. Because of this placement, the cooling airflow intake structure 10 is given a configuration where the cooling airflow passes through (the air-side channel of) the cooling unit 22 along a direction (see arrow FA shown in FIG. 1) substantially orthogonal to the front surface of the cooling unit 22 (the direction of inclination).

Moreover, the cooling airflow intake structure 10 is equipped with flaps 36 that inhibit the entry of foreign matter into the first duct 28. In this embodiment, the plural flaps 36 whose lengthwise direction coincides with the vehicle longitudinal direction are juxtaposed in parallel in the vehicle width direction. More specifically, each flap 36 is configured as a flat wall (flat plate-shaped member) extending in the vehicle longitudinal direction and in the vehicle vertical direction and, as shown in FIG. 3, bridges a front edge 26A and a rear edge 26B of the first inlet port 28A in the undercover 26.

Furthermore, in the cooling airflow intake structure 10, a venturi wall 38 serving as an inclined wall is formed on the vehicle front side of the first duct 28 in the undercover 26. The venturi wall 38 is configured by forming a constricting section (throat section) T closest to the road surface R on the vehicle longitudinal direction front side of the undercover 26 with respect to the first duct 28 (the first inlet port 28A). Specifically, the venturi wall 38 is configured to include as its main portions a front-side inclined wall 38A having a downward pitch from the front end of the undercover 26 toward the constricting section T and a rear-side inclined wall 38B having an upward pitch from the constricting section T toward the front edge 26A of the first inlet port 28A.

Because of this, the venturi wall 38 has a configuration that forms a venturi shape closest to the road surface R at the constricting section T (where the channel cross section is constricted) under the floor of the vehicle body 11. The cooling airflow intake structure 10 equipped with this venturi wall 38 is given a configuration where the vehicle-induced airflow proceeding toward the vehicle rear side is channeled toward the vehicle upper side by the Venturi effect of the venturi wall 38 produced on the vehicle front side with respect to the first inlet port 28A and easily flows into the first duct 28 along the direction of arrow FA described above (the vehicle-induced airflow flows into the first duct 28 at an angle close to the direction of arrow FA with respect to the road surface R before reaching the cooling unit 22).

It suffices for the venturi wall 38 to be formed at least on the vehicle longitudinal direction front side of the installation range of the first duct 28 (the first inlet port 28A) in the vehicle width direction, but in this embodiment, the front portion of the undercover 26 is configured to be the venturi wall 38 that is an inclined wall across substantially the entire width in the vehicle width direction. Further, in this embodiment, as shown in FIG. 1 and FIG. 2, the flaps 36 extend on the lower surface side of the rear-side inclined wall 38B. In other words, the front side portions of the flaps 36 with respect to the first inlet port 28A are pendant from the lower surface of the rear-side inclined wall 38B.

Further, in this embodiment, a pair of side walls 40 are disposed upright along both vehicle width direction side edges of the first inlet port 28A. Each side wall 40 is formed in the same shape as the flaps 36. Additionally, the pair of side walls 40 are bridged by transverse flaps 42 whose lengthwise direction coincides with the vehicle width direction. In this embodiment, the plural (in this embodiment, three) transverse flaps 42 that are disposed apart from each other in the vehicle longitudinal direction bridge the pair of side walls 40 while intersecting the flaps 36. That is, the flaps 36 are given a configuration where they intersect the transverse flaps 42 to form a lattice when seen in a plan view. Because of this, the flaps 36 are supported and reinforced by the undercover 26 via the transverse flaps 42 as described above. Further, the transverse flaps 42 have wing shapes as shown in FIG. 1. The transverse flaps 42 are given wing shapes that form an airflow proceeding toward the vehicle upper side in the first duct 28.

Additionally, the cooling airflow intake structure 10 is equipped with the second duct 44 that channels a cooling airflow from the front bumper 15 to the cooling unit 22. Specifically, a second inlet port 44A that is formed opening frontward and is for taking the vehicle-induced airflow into the second duct 44 is formed in the lower portion of the bumper cover 15B. The rear end of the second duct 44 is configured to be the confluence port 44B formed in the shroud 30. Consequently, the second duct 44 merges with the first duct 28 at the confluence port 44B that is the rear end of the second duct 44. The opening width of the second inlet port 44A and the channel width of the second duct 44 are configured to be equal to or greater than the width of the cooling unit 22 (the first duct 28) along the vehicle width direction.

As shown in FIG. 1, the lower surface (lower wall) of the second duct 44 is configured (defined) by the undercover 26. The upper surface (upper wall) of the second duct 44 is configured (defined) by an upper wall portion 15C, which is disposed extending toward the vehicle rear side from the upper edge of the second inlet port 44A in the bumper cover 15B, an oil pan 46, and a differential case 48. As shown in FIG. 3, on both vehicle width direction outer sides of the oil pan 46, upright walls 52 (also see FIG. 2) are disposed upright from the undercover 26. As shown in FIG. 3, the exhaust pipe 19 of the power unit 12 is placed on the width direction outer side of the upright walls 52 and the side walls 32 of the shroud 30 in the installation range of the first duct 28 and the second duct 44 in the vehicle longitudinal direction.

As shown in FIG. 3 and FIG. 4, the oil pan 46 is configured as a result of an oil pan 46A that receives lubricating oil of the internal combustion engine configuring the power unit 12 and an oil pan 46B that receives lubricating oil of (a transmission mechanism such as the transmission configuring) the transaxle configuring the power unit 12 being juxtaposed in the vehicle width direction. As shown in FIG. 4, the oil pans 46A and 46B are formed and placed such that their bottom surfaces become substantially flat (even). Because of this, the second duct 44 has a configuration where the distance between its upper and lower surfaces becomes substantially constant at each section in the vehicle width direction. The differential case 48 houses an unillustrated differential gear. FIG. 1 shows a drive shaft 45 that is an output shaft of the differential gear.

Furthermore, as shown in FIG. 1, the cooling airflow intake structure 10 has a constricting structure (venturi structure) 50 in which the vertical distance is made narrower at one section of the second duct 44 in the vehicle longitudinal direction than at other sections. The constricting structure 50 in this embodiment is configured by the oil pan 46 and the undercover 26. Specifically, the oil pan 46 is formed in a downward-facing convex shape when seen in a side sectional view, and a lowermost portion 46C of the oil pan 46 forms the constricting structure 50 between the lowermost portion 46C and the rear-side inclined wall 38B of the undercover 26.

Additionally, the vertical distance in the second duct 44 is gradually reduced from the portion where the upper wall portion 15C of the bumper cover 15B forms the upper wall toward the constricting structure 50 (the lowermost portion 46C of the oil pan 46), and the vertical distance in the second duct 44 is gradually increased from the constricting structure 50 toward the confluence port 44B. Because of this, the constricting structure 50 is given a configuration that quickens the flow speed of the airflow that has passed therethrough (achieves the Venturi effect). Further, the second duct 44 is given a configuration which, because of the rear-side inclined wall 38B having an upward pitch rearward and the shape by which the vertical distance increases on the rear side of the constricting structure 50, channels the airflow having an upward velocity component (vector) to the cooling unit 22 (the first duct 28). That is, the second duct 44 channels the airflow to the first duct 28 at an angle close to the direction of arrow FA.

Further, in the cooling airflow intake structure 10, the fan unit 24 is electrically connected to an unillustrated cooling ECU serving as control means. The cooling ECU is configured to actuate the fan unit 24 in a case where the vehicle speed of the automobile V is equal to or less than a predetermined speed and the cooling water temperature is equal to or greater than a predetermined temperature and to stop or prohibit actuation of the fan unit 24 in a case where the vehicle speed of the automobile V exceeds the predetermined speed on the basis of signals from vehicle speed sensors.

Next, the action of the embodiment will be described.

In the automobile V to which the cooling airflow intake structure 10 of the above-described configuration is applied, the cooling water circulates through the power unit 12 and the cooling unit 22 when the automobile V travels. This cooling water is cooled by heat exchange with air in the cooling unit 22. Further, at the time when the air conditioning unit is actuated, the coolant circuits in the order of the cooling unit 22, an expansion valve, an evaporator, and a compressor, and the refrigeration cycle is formed. The cooling unit 22 functions as a condenser that cools and condenses the coolant by heat exchange with air.

The heat exchange in this cooling unit 22 is performed by the vehicle-induced airflow of the automobile V or the airflow produced by the actuation of the fan unit 24 flowing as cooling air through the air-side channel of the cooling unit 22. The cooling ECU actuates the fan unit 24 when it judges that the vehicle speed of the automobile V is equal to or less than the predetermined vehicle speed and the cooling water temperature is equal to or greater than the predetermined temperature. Then, the air under the floor flows through the first inlet port 28A and into the first duct 28 because of the suction force of the fan unit 24, and this air is channeled to the cooling unit 22 by the first duct 28. Further, the air in front of the automobile V flows through the second inlet port 44A and into the second duct 44 in accompaniment with the traveling of the vehicle or because of the suction force of the fan unit 24, and this air merges with the air in the first duct 28 and is channeled to the cooling unit 22.

On the other hand, the cooling ECU stops the fan unit 24 when it has judged that the vehicle speed of the automobile V has exceeded the predetermined vehicle speed. In this case, as shown in FIG. 1, a vehicle-induced airflow Fh1 of the automobile V flows from the first inlet port 28A into the first duct 28 with a vector component toward the vehicle upper side and passes through the cooling unit 22. At this time, the vehicle-induced airflow Fh1 is channeled toward the vehicle upper side by the Venturi effect produced in front of the first inlet port 28A by the venturi wall 38, and a large quantity of air is taken into the first duct 28 through the first inlet port 28A. Further, a vehicle-induced airflow Fh2 flows from the second inlet port 44A into the second duct 44 and merges with the air in the duct 28. At this time, the flow speed of the vehicle-induced airflow Fh2 is increased by the Venturi effect as it passes through the constricting structure 50, and the vehicle-induced airflow Fh2 is taken into the first duct 28.

Further, in the cooling airflow intake structure 10, foreign matter such as pebbles, sand, and dirt is inhibited from reaching the cooling unit 22 via the first inlet port 28A because the flaps 36 and the transverse flaps 42 are disposed in the first inlet port 28A. That is, it is easy for foreign matter to be kicked up by the rotating front wheels Wf toward the first inlet port 28A including the portion positioned on the vehicle rear side of the contact portion S at which the front wheels Wf contact the road surface R, but this foreign matter is inhibited from entering the duct 28 because it strikes the flaps 36.

Moreover, the flaps 36 inhibit the airflow taken in from the first inlet port 28A from concentrating in the center in the vehicle width direction (to fulfill a rectifying action). Further, the transverse flaps 42 upwardly direct the airflow taken in from the first inlet port 28A and make it easy for that airflow to be channeled to the upper portion of the cooling unit 22. In the second duct 44, it is difficult for the flow rate of the airflow to vary in the vehicle width direction because the opening width of the second inlet port 44A and the channel width are configured to be equal to or greater than the cooling unit 22.

Here, in the cooling airflow intake structure 10, because the two ducts comprising the first duct 28 and the second duct 44 are disposed, it becomes easy to ensure the flow rate of the airflow serving as the cooling airflow compared to a configuration that channels the cooling airflow from outside the vehicle to the cooling unit 22 via only the first duct 28. Further, because the second duct 44 is placed between the undercover 26 and the power unit 12, the airflow from the second inlet port 44A is channeled to the cooling unit 22 without passing around the power unit 12. In other words, the airflow that has been taken in from the second inlet port 44A is channeled to the cooling unit 22 while it is kept from being affected by the heat of the power unit 12. In particular, in the cooling airflow intake structure 10, because the exhaust pipe 19 is placed on the outer side of the upright walls 52 and the shroud 30, the airflow that has been taken in from the second inlet port 44A is also kept from being affected by the heat of the exhaust pipe 19.

Because of these, in the cooling airflow intake structure 10, the required cooling function (heat exchange) is fulfilled in the cooling unit 22. That is, compared to a comparative example where the airflow is channeled from outside the vehicle to the cooling unit 22 via only the first duct 28, the supply of the airflow to the cooling unit 22 can be increased and the cooling performance of the cooling water and the coolant resulting from the cooling unit 22 improves. Also, because it is difficult for the airflow that increases with respect to the comparative example to be affected by the heat of the power unit 12 and the exhaust pipe 19, this contributes to a further improvement of the cooling performance of the cooling water and the coolant resulting from the cooling unit 22.

In this way, in the cooling airflow intake structure 10 pertaining to the present embodiment, the airflow serving as the cooling airflow from outside the vehicle can be efficiently channeled to the cooling unit 22.

In particular, in the cooling airflow intake structure 10, in a case where the automobile V is traveling at a low speed, airflows are channeled to the cooling unit 22 sharingly by the first duct 28 and the second duct 44. Because of this, in a case where the automobile V is traveling at a low speed, it becomes easy to ensure the flow rate of the airflow serving as the cooling airflow as described above.

On the other hand, in a case where the automobile V is traveling at a high speed, it is easier for the vehicle-induced airflow to flow into the second duct 44 than the first duct 28, so the airflow is channeled to the cooling unit 22 mainly through the second duct 44. Because of this, even in a case where the automobile V is traveling at a high speed, it becomes easy to ensure the flow rate of the airflow serving as the cooling airflow as described above.

Moreover, because the airflow is channeled to the cooling unit 22 mainly through the second duct 44 at the time when the automobile V is traveling at a high speed, the airflow channeled from the first duct 28 to the cooling unit 22 decreases compared to a configuration not equipped with the second duct 44. Consequently, the force in the direction in which the vehicle body 11 is lifted up that is produced by the airflow of the first duct 28 is inhibited. Because of this, the traveling stability of the automobile V during high-speed travel improves. Further, the ground contact pressure of each wheel (tire) including the front wheels Wf increases.

Furthermore, by employing a structure in which the airflows channeled to the cooling unit 22 are shared by the first duct 28 and the second duct 44 as described above, the first duct 28 and particularly the first inlet port 28A can be miniaturized compared to a structure not equipped with the second duct 44. For this reason, the entry of foreign matter into the cooling unit 22 via the first inlet port 28A and the first duct 28 is effectively inhibited. Further, the adhesion of snow and dirt around the first inlet port 28A is inhibited. Moreover, the impact of snow and dirt adhering around the first inlet port 28A on the cooling performance of the cooling unit can be reduced.

Further, in the cooling airflow intake structure 10, the lower surface of the second duct 44 is configured by the undercover 26 and the upper surface of the second duct 44 is configured by the upper wall portion 15C of the bumper cover 15B, the oil pan 46, and the differential case 48. That is, the upper surface of the second duct 44 is configured by functional parts placed in the power unit chamber 14 as parts having functions independent of the second duct 44. For this reason, the second duct 44 in which it is difficult for the vehicle-induced airflow to be affected by the heat of the power unit 12 is configured by effectively utilizing the space between the undercover 26 and the power unit 12 in the vehicle vertical direction.

In particular, because the lower surfaces of the oil pans 46A and 46B configuring the oil pan 46 are configured to be substantially flat, the distance between the upper and lower surfaces of the second duct 44 is configured to be substantially constant at each section in the vehicle width direction. For example, in a second duct 100 pertaining to a comparative example shown in FIG. 5, an oil pan 102 for the transmission projects toward the road surface R with respect to an oil pan 104 for the engine. Additionally, the exhaust pipe 19 is passed between the oil pans 102 and 104. Because of these, in the comparative example shown in FIG. 5, it is easy for the vertical distance in the second duct 100—that is, the flow rate—to vary in the vehicle width direction, and the air that has exchanged heat with (the exhaust gas in) the exhaust pipe 19 becomes channeled to the cooling unit 22.

In contrast, in the cooling airflow intake structure 10, the lower surfaces of the oil pans 46A and 46B are configured to be substantially flat. Because of this, the second duct 44 (the constricting structure 50) contributes to the bias of the flow rate of the airflow being small at each position in the vehicle width direction and to good cooling (heat exchange) being fulfilled at each section of the cooling unit 22 in the vehicle width direction.

Moreover, in the cooling airflow intake structure 10, because the constricting structure 10 is disposed in the second duct 44, the flow speed of the airflow that has been taken in from the second inlet port 44A is quickened as the airflow passes through the constricting structure 50, and the airflow is channeled to the cooling unit 22. Because of this, the airflow from the second duct 44 passes through the cooling unit 22 in a short amount of time (remaining at a low temperature), which contributes to an improvement in the cooling performance of the cooling unit 22.

Further, because the flow speed of the airflow in the second duct 44 is increased by the constricting structure 50, or in other words because the pressure drops, that airflow is inhibited from impeding the airflow in the first duct 28 (a promotion of the intake of the airflow from the first inlet port 28A by the negative pressure of the high-speed airflow (the vehicle-induced airflow Fh2) can also be expected). That is, in the configuration where the second duct 44 merges with the first duct 28, the airflow in the second duct 44 is inhibited from impeding the airflow in the first duct 28 because the constricting structure 50 is disposed on the upstream side of the confluence port 44B. Because of these, the airflows can be more efficiently channeled from both ducts 28 and 44 to the cooling unit 22.

Moreover, in the cooling airflow intake structure 10, because the first inlet port 28A, the outlet port 28B, and the confluence port 44B are formed in the shroud 30, the first duct 28 with which the second duct 44 merges can be formed by a simple structure.

In each of the above-described embodiments, an example has been described where the upper surface of the second duct 44 is defined by the upper wall portion 15C of the bumper cover 15B, the oil pan 46, and the differential case 48, but the present invention is not limited to this; for example, the upper surface of the second duct 44 may be configured using part of the upper wall portion 15C of the bumper cover 15B, the oil pan 46, and the differential case 48, and the upper surface of the second duct 44 may be configured by a dedicated part.

Further, in each of the above-described embodiments, an example has been described where the flaps 36 and the transverse flaps 42 serving as foreign matter entry inhibiting members are disposed, but the present invention is not limited to this and may, for example, be given a configuration where one or both of the flaps 36 and the transverse flaps 42 are not disposed. Further, a mesh member or the like may be disposed as a foreign matter entry inhibiting member in the second inlet port 44A.

Moreover, in each of the above-described embodiments, an example has been described where the venturi wall 38 is formed on the vehicle front side of the first duct 28, but the present invention is not limited to this; for example, the undercover 26 in front of the first duct 28 may be formed flatly (substantially parallel with respect to the road surface R). Moreover, in addition to the venturi wall 38 or instead of the venturi wall 38, an aerodynamic structure that allows the vehicle-induced airflow Fh to flow into the first duct 28 may be disposed. As this aerodynamic structure, for example, an airflow channeling member such as spats that project under the floor from the lower end of the cooling unit 22 can be used. Further, this airflow channeling member may, for example, be one whose shape and posture are varied depending on the vehicle speed.

Furthermore, in each of the above-described embodiments, an example has been described where the constricting structure 50 is disposed in the second duct 44, but the present invention is not limited to this and may, for example, be given a configuration where the constricting structure 50 is not disposed. Further, the configuration where the constricting structure 50 is disposed is not limited to being a configuration where the oil pan 46 forms the constricting structure 50; it suffices as long as the constricting structure 50 is formed by a member that defines the upper surface or the lower surface of the second duct 44.

Further, in each of the above-described embodiments, an example has been described where the power unit 12 including the internal combustion engine and the motor is placed in the power unit chamber 14 that is positioned in front of the cabin C, but the present invention is not limited to this and may, for example, be given a configuration where the power unit 12 does not include a motor (engine vehicles such as common FF vehicles, FR vehicles, and 4WD vehicles) or a configuration where the power unit does not include an internal combustion engine (an electric automobile).

Moreover, in each of the above-described embodiments, an example has been described where the power unit 12 is configured to include the electric motor, the unillustrated generator, the power splitter, the transmission that is a continuously variable transmission or the like, etc., but the present invention is not limited to this; for example, the transaxle configuring the power unit 12 may, for example, be an ordinary transaxle such as manual transmission (MT), a torque converter or other automatic transmission (AT), or a continuously variable transmission (CVT). It is also possible for these transaxles to be taken as not being included in the power unit 12 (for the power unit to be taken as being configured to include as its main portion a drive source such as an engine).

In addition, the present invention is not limited to the configurations of the above-described embodiment and, it goes without saying, can be modified and implemented in various ways without departing from the scope of the present invention.

The invention claimed is:

1. A cooling airflow intake structure comprising:
   a power unit that generates a driving force for a vehicle to travel;
   an undercover that covers, from a vehicle underside, a power unit-use space in which the power unit is placed;
   a body to be cooled that is a cooling unit which includes a heat exchanger and that is placed on a vehicle rear side of the power unit;
   a first duct that channels air to the body to be cooled from a first inlet port that is formed opening directly toward a road surface in the undercover; and
   a second duct that is disposed between the power unit and the undercover in a vehicle vertical direction and channels air to the body to be cooled from a second inlet port that is formed opening toward a vehicle front side in a bumper cover.

2. The cooling airflow intake structure according to claim 1, wherein
   a lower surface of the second duct is configured by the undercover and
   at least part of an upper surface of the second duct is configured by a lower surface of a functional part placed in the power unit-use space.

3. The cooling airflow intake structure according to claim 1, wherein the second duct has a constricting structure in which the distance between its upper surface and its lower surface is made narrower at one section in a vehicle longitudinal direction than at other sections.

4. The cooling airflow intake structure according to claim 2, wherein at least part of the upper surface of the second duct is configured by an oil pan that receives lubricating oil of the power unit or an oil pan that receives lubricating oil of a transmission mechanism that transmits the driving force of the power unit to vehicle wheels.

5. The cooling airflow intake structure according to claim 3, wherein the second duct merges with the first duct on the vehicle front side of the body to be cooled and on the vehicle rear side of the constricting structure.

6. The cooling airflow intake structure according to claim 5, wherein
   the first inlet port is formed between the power unit and the body to be cooled in the undercover,
   the first duct is formed by a shroud that covers the space between the first inlet port and the body to be cooled, and a confluence port with which the second duct merges is formed opening toward the vehicle front side in the shroud.

\* \* \* \* \*